United States Patent [19]

Brandom et al.

[11] Patent Number: 5,547,996

[45] Date of Patent: Aug. 20, 1996

[54] METHOD OF PRODUCING FOAMED POLYMER MATERIALS

[75] Inventors: Donald K. Brandom; Jose P. DeSouza; Donald G. Baird; Garth L. Wilkes, all of Blacksburg, Va.

[73] Assignee: The Center for Innovative Technology, Herndon, Va.

[21] Appl. No.: 282,029

[22] Filed: Jul. 29, 1994

[51] Int. Cl.[6] .................................................. C08J 9/08
[52] U.S. Cl. ........................... 521/134; 521/99; 521/113; 521/128; 521/130; 521/136; 521/187
[58] Field of Search ...................................... 521/163, 121, 521/128, 130, 176, 134, 136, 187, 99, 113

[56] References Cited

U.S. PATENT DOCUMENTS

| | | | |
|---|---|---|---|
| 4,975,470 | 12/1990 | Matzner et al. | 521/134 |
| 4,990,548 | 2/1991 | Gillis et al. | 521/163 |
| 5,114,983 | 5/1992 | Stahlke et al. | 521/134 |
| 5,179,130 | 1/1993 | Bland et al. | 521/134 |

OTHER PUBLICATIONS

Mohanty, D. K., et al., 32nd Int'l SAMPE Symposium, "Ketimine Modifications as a Route to Novel . . . Poly(Arylene Ether Ketone Homo– and Copolymers", Apr. 6–9, 1987, pp. 408–419.

*Primary Examiner*—James J. Seidleck
*Assistant Examiner*—John M. Cooney, Jr.
*Attorney, Agent, or Firm*—Whitham, Curtis, Whitham & McGinn

[57] ABSTRACT

Reacting carbonyls, such as aldehydes and ketones, with amines produces a ketimine or aldimine and a water byproduct. When the ketimine or aldimine reaction occurs in a polymer composition, the polymer becomes foamed due to the evolution of water. Hence, carbonyl and amine containing compounds may be introduced into a polymeric composition to serve as an in-situ blowing agent. The carbonyl and amine containing compounds may be different polymers which will be combined through a ketimine or aldimine linkage to form a graft co-polymer, they may be small molecular weight additives that are placed in the composition with a polymer that is to be foamed as a byproduct of a ketimine or aldimine reaction of the additives, or they may be a polymer containing a carbonyl or amine moiety and a small molecular weight additive compound that will react with the moiety on the polymer to form a ketimine or aldimine.

10 Claims, 3 Drawing Sheets

METHOD OF PRODUCING FOAMED POLYMER MATERIALS

BACKGROUND OF THE INVENTION

1. Field of the Invention

The invention is generally related to the production of foamed polymeric materials and, more particularly, to the use of a chemical reaction between an amine and a carbonyl which produces a ketimine, or aldimine, and water byproduct as an in-situ mechanism for foaming polymeric materials.

2. Description of the Prior Art

Production of foamed polymeric materials has become increasingly important to meet the demands of modern living. The foamed polymeric materials are widely used for insulation purposes in aircraft, automobiles and other land vehicles, and in buildings. In addition, foamed polymeric materials have utility as filter media, as catalyst supports, in biological implants for drug delivery, and in a wide variety of other applications. Polyarylene ether ketones (PAEKs) have strength and toughness characteristics which make them an attractive substitute for metal and steel as structural support members. Foamed PAEKs have the advantage of being a light weight, high strength material. By sandwiching a PAEK foam between non-foamed PAEK layers, a rigid, lightweight structure is produced that does not suffer from interfacial incompatibility between the foam and the non-foamed members. It would be advantageous to provide a low cost, environmentally sound, technique for foaming polymeric materials, particularly high strength materials such as PAEKs and high performance materials such as polyimides.

U.S. Pat. No. 4,026,833 to D'Aleio discloses the production of foamed polyimides being produced via a chemical reaction between aromatic polyisocyanates and aromatic dianhydrides. During the reaction, carbon dioxide is produced and serves as a blowing agent to create the foam. U.S. Patent to Parfoundry et al. is another example of using carbon dioxide as a blowing agent for creating a foamed polymer. In Parfoundry et al., ketimines are used as isocyanate reactive compounds in the production of polyurethane foams.

U.S. Pat. No. 4,990,548 to Gillis et al. discloses the use of a ketimine reagent to produce a foamed polymeric product. In Gillis et al., a ketimine product is created by the reaction of an amine and a carbonyl compound. A gaseous carbonyl product is then generated when water reacts with the imine, and the gaseous carbonyl product serves as a blowing agent for foaming the polymer.

A water foamed poly(aryl ether) (PAE) is described in U.S. Pat. No. 5,179,130 to Bland et al. In operation, water is blended with the PAE in the melt state under pressure. Subsequently, the pressure is released and the gaseous water acts as a blowing agent to foam the PAE. U.S. Pat. No. 4,506,037 to Suzuki also discloses the use of water as a blowing agent. In Suzuki, water is adhered to microporous particles which are then melt blended with a polymer under pressure. Subsequent depressurization at elevated temperatures is then used to foam the system. U.S. Pat. No. 5,153,232 to Primeaux discloses a system where the claim water is "the sole blowing agent" for the production of polyurea foams. However, in Primeaux the gas which actually "blows" the foam is carbon dioxide that is produced from a reaction between water and isocyanate.

U.S. Pat. No. 4,426,463 to Gagliani and U.S. Pat. No. 4,546,115 to Long disclose the use of both water and alcohols, in combination, as blowing agents. In Gagliani, a monoimide is formed by the reaction of an oxoimine with an aromatic anhydride which is subsequently esterified, and is followed by the addition of a diamine. The reaction product is probably an amide-ester. The dried product is heated to produce an imide, with a consequent loss of the esterifying alcohol and water, both in a gaseous state, to foam the molten mass. In Long, a dianhydride is esterified with subsequent addition of diamine and drying of the product. Heating produces water and alcohol which results in a foamed imide.

The above-identified patents have the advantage that organic blowing agents, which have been commonly used in prior art foam production, are not employed. Organic blowing agents pose disposal and explosion problems. Hence, the production of water vapor or carbon dioxide offers a cleaner, as well as safer, means for producing foam. In addition, the above-identified patents generally describe foaming techniques that do not require excessive mechanical manipulation of the polymeric material to foam the product. Thus, the cost for foam production is reduced due to lower equipment and energy costs.

Nevertheless, none of the above-identified methods disclose an ideal technique for foaming PAEK materials. Thus, a need exists for PAEK foam production that is low cost, effective, and does not pose environmental hazards. In addition, it would be advantageous to provide an alternative technique for foaming a wide variety of polymeric materials in a low cost, effective, and safe manner.

U.S. Pat. No. 4,721,732 to Dubrow et al. discloses the production of microporous PAEK materials by a blending and extraction process. In Dubrow et al., a blend of two molecularly compatible polymers is formed with subsequent selective solvent extraction of one polymer to produce the microporous structure. U.S. Pat. Nos. 4,904,426, 4,992,485, and 5,064,580 all disclose similar processes of mixing and "leaching" to produce microporous PAEK fibers or films. U.S. Pat. No. 4,904,426 to Lundgard et al. achieves the microporous structure by mixing PAEKs with an organic solvent, extrusion of the mix, and subsequent solvent extraction. U.S. Pat. No. 4,992,485 to Koo et al. describes the production of microporous poly(ether ether ketone) (PEEK), which is a specific type of PAEK, using non-sulfonating acid solvents. In Koo et al., a coagulation step is used instead of extrusion before solvent extraction. U.S. Pat. No. 5,064,580 to Beck et al. discloses the use of a plasticizer instead of a solvent for producing a microporous structure.

It should be understood that the microporous structures discussed in the above-identified patents are not true "foams". Rather, these structures are generally solid and have micropores therein. A process for producing foamed PAEK materials is needed. A foamed PAEK material will have the advantage of being lightweight, as well as the inherent strength and toughness properties of PAEKs.

SUMMARY OF THE INVENTION

It is an object of this invention to provide a low cost, effective, and environmentally safe technique for generating foamed polymeric materials, and particularly foamed PAEK materials and foamed high performance materials such as polyimides, both of which have excellent temperature resistance, flame resistance and low smoke generation properties.

According to the invention, foamed polymeric materials are produced by taking advantage of the gaseous water byproduct of a reaction between a carbonyl moiety with an amine moiety at elevated temperature. The gaseous water blows the polymeric material into a foam as it escapes the molten mass. The reaction can be a ketimine reaction between a ketone and an amine or an aldimine reaction between an aldehyde and an amine.

In one embodiment, two different polymers are combined to create a graft co-polymer through a ketimine or aldimine linkage. During co-polymer formation, the water byproduct blows the co-polymer into a foam. There are several advantages to this embodiment of the invention. First, the graft co-polymer produced will have attributes of two different polymeric materials. Thus, polymer starting materials can be selected and combined to produce a foam having a combination of desired characteristics. Second, no additional blowing agent needs to be added to the polymer combination during foam formation. Rather, the reactive constituents are carried by the polymers themselves. The degree of foaming can be tailored to the needs of the manufacturer by controlling the amount of amine and/or carbonyl functionality on the two polymers being combined, controlling the heating and mixing conditions, and selection of the molecular weight ranges of the polymers being combined. Having greater quantities of the carbonyl and amine reactive species will create foams of larger pore or cell size in the polymeric material since greater quantities of reactive species will produce larger quanties of water vapor.

In a second embodiment, small molecular weight compounds having carbonyl (aldehyde or ketone) and amine functionality are added to a polymer or polymeric blend. Upon heating the polymer or polymeric blend, the small molecular weight compounds will combine and produce a gaseous water vapor that blows the polymer or polymeric blend as it emanates from the molten mass. After foaming, the combined compounds can be leached out of or extracted from the polymeric material. Alternatively, if desired, the combined compounds can be left in place in the foamed polymer matrix. The porosity of the foamed product is controlled by adding specified amounts of the reactive small molecular weight compounds to the polymer or polymeric blend.

In a third embodiment, small molecular weight compounds having either carbonyl (aldehyde or ketone) or amine functionality are combined with a polymer having the opposite functionality (e.g., in the case of amine functionality of the small molecular weight compound, the polymer has carbonyl functionality, and in the case of carbonyl functionality of the small molecular weight compound, the polymer has amine functionality). Upon heating, the small molecular weight compound bonds to the polymer via a ketimine or aldimine linkage and produces gaseous water vapor that blows the polymer into a foam. The degree of foaming can be controlled by controlling the concentration of the small molecular weight compound added to the polymer, as well as by selectively controlling the degree of amine or carbonyl functionality along the polymer backbone. The third embodiment has the advantage of being able to selectively functionalize the polymer with a compound of interest as well as blow it into a foam. In particular, after foam formation the compound of interest is bonded to the polymer chain through a ketimine or aldimine linkage. The third embodiment may be useful for providing the polymer with functional groups which promote adhesion of metals, which is beneficial in microelectronics manufacturing. In addition, the third embodiment may be useful for functionalizing the polymer with an antibody, cation, or anion of interest such that the foamed polymer could be used in filtering and chromatography applications. The third embodiment may also be useful for attaching a drug to the polymer, such that the foamed polymer can serve as a drug delivery vehicle for implanted devices.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
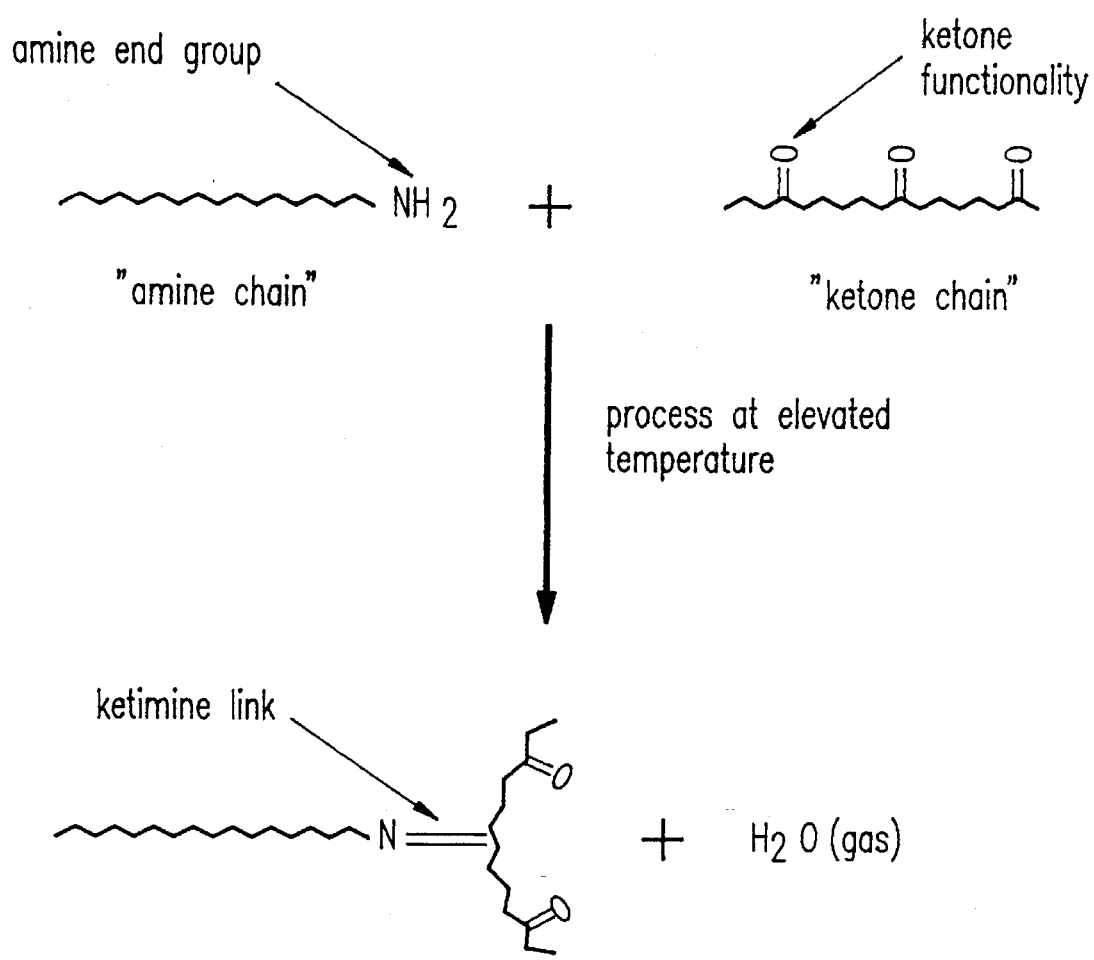
FIG. 1 is a generalized reaction scheme for the formation of ketimines.
Figure 2:
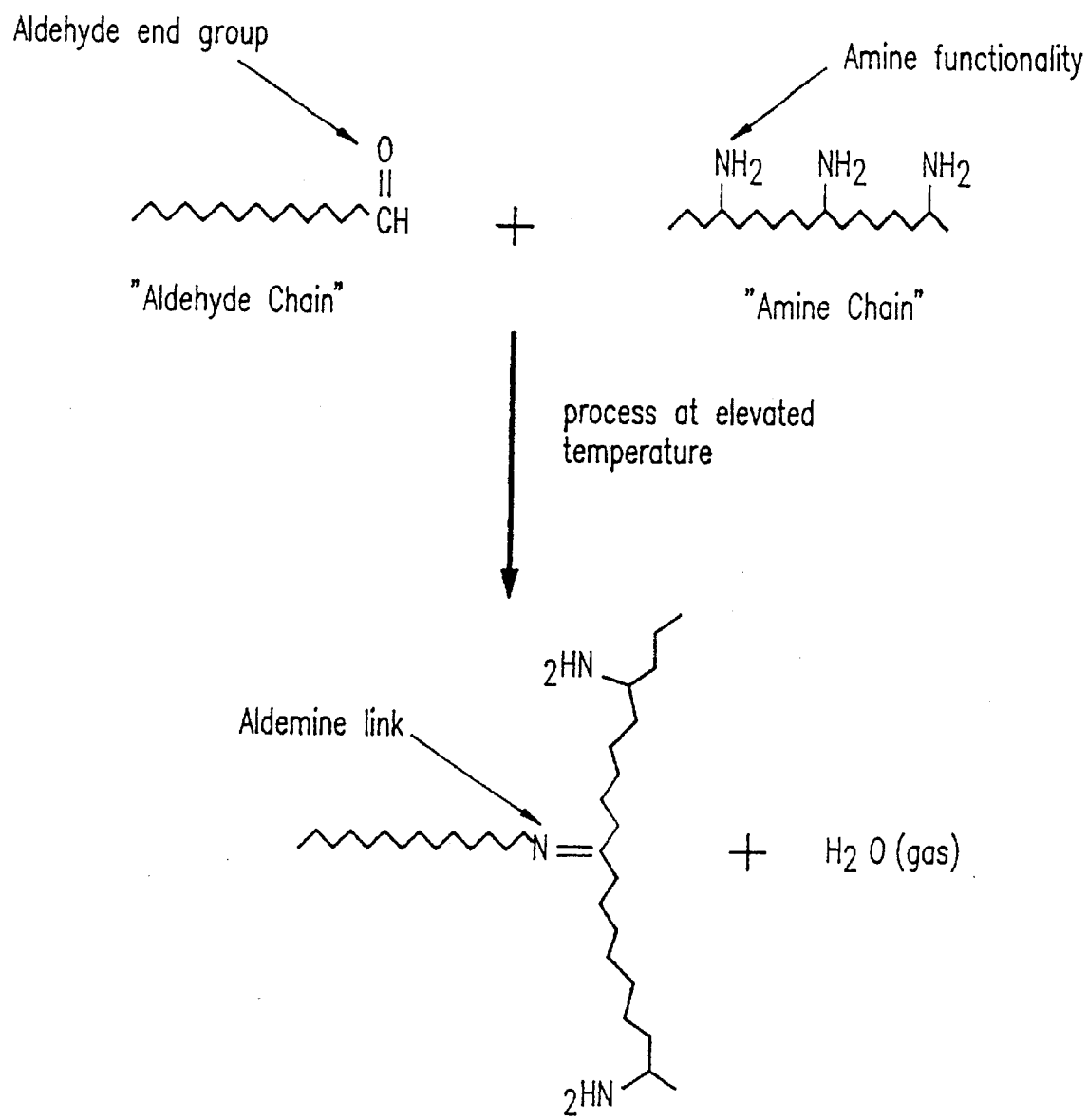
FIG. 2 is a generalized reaction scheme for the formation of aldimines.

FIG. 1 shows the reaction of an amine end group of a polymer with a ketone moiety on a polymeric ketone chain at elevated temperatures. FIG. 2 shows the reaction of an aldehyde on a polymer with an amine moiety on another polymeric chain. The ketimine reaction of FIG. 1 and the aldimine reaction of FIG. 2 both produce $H_2O$ gas. This invention utilizes the production of $H_2O$ gas during a ketimine or aldimine reaction to blow a polymeric material into a foamed product. While FIGS. 1 and 2 show the reaction of an end group of one polymer with a backbone moiety of another polymer, this invention also has general application to the following situations:

(1) combining two different polymers where carbonyl and amine backbone moieties on each of the polymers react by ketimine or aldimine reaction;

(2) combining two different polymers where carbonyl and amine end group moieties on each of the polymers react by ketimine or aldimine reaction;

(3) reacting a carbonyl moiety with an amine moiety on the same polymer by a ketimine or aldimine reaction;

(4) reacting a carbonyl or amine moiety of a polymer with a small molecular weight compound having a corresponding carbonyl or amine moiety via a ketimine or aldimine reaction;

(5) reacting two small molecular weight compounds, one of which has a carbonyl moiety and the other of which has an amine moiety, via a ketimine or aldimine reaction while in the presence of a polymeric material to be foamed; and (6) any other situation where the gaseous water vapor produced from a ketimine or aldimine reaction is used to foam a polymeric material.

This invention is particularly directed to the discovery that the gaseous water vapor produced by ketimine and aldimine reactions can be effectively used to blow a polymeric material into a foam.

In a first embodiment of the invention, two different polymers are combined together and form a graft co-polymer via a ketimine or aldimine reaction with the resulting product being a foamed graft co-polymer. The polymers which are being combined will typically have molecular weight ranging between 1000 and 100,000. All that is required is that one polymer have carbonyl functionality and the other polymer have amine functionality. No blowing agent is required for forming the graft co-polymer foams since the reactive carbonyl and amine components are carried by the two polymers which are being joined together via the ketimine or aldimine linkage. PAEK polymers, such as poly(ether ketone) (PEK), poly(ether ether ketone) (PEEK), poly(ether ketone ketone) (PEKK), and the like, are particularly useful as the source of the carbonyl moiety. Polyimide polymers such as ULTEM available from General Electric are particularly useful as the source of the amine moiety.

The degree of foaming in the graft co-polymer end product can be selectively controlled using the ketimine and aldimine reaction. For example, by using polymers with greater quantities of carbonyl and/or amine moieties, greater quantities of water will be produced from the ketimine reaction or aldimine reaction. This larger quantity of water will produce a more porous or less dense foamed material as it leaves the molten mass. In addition, mixing of the melt will assist in producing the foam product, and the rate of mixing may also be used to control the porosity of the foam product. By mixing the polymers during the reaction phase, there is more chance for the amine and carbonyl moieties to come in contact with each other and react. Mixing can be achieved using a screw extruder or by other means and the rate of mixing can be adjusted by speeding up or slowing down the screw. The heat and pressure conditions in the reaction vessel can also be used to control foaming. The temperature of the polymer as well as the pressure on the polymer will affect diffusion. High temperatures enhance molecular diffusion which favors more reactions. High temperatures also result in larger volumes of gaseous water being produced due to increased expansion forces for rapid bubble growth. Lower pressures will allow for greater expansion of the gases and will increase the foam cell size and, thus, cause greater foaming. The reduced melt viscosity which results at higher temperatures will also present less resistance to bubble growth. Furthermore, the time dependent nature of chemical reactions, referred to as kinetics, can be used for controlling the porosity of the foamed product. Specifically, longer reaction times will allow more reactions to occur, thus producing a more porous or less dense polymeric material. Bubble nucleation and growth is also a time dependent process.

A series of experiments was conducted with a PEKK and polyimide model. The PEKK polymer has a repeat unit with three phenyl rings separed by an oxygen, carbonyl, and carbonyl moiety, respectively. The PEKK polymer used had a molecular weight ranging between 10,000 and 40,000 g/mole. The polyimide used was ULTEM®, a compound commercially available from GE Plastics. The polyimide had a molecular weight ranging from 10,000 g/mole to 30,000 g/mole (although oligomeric units of 1,000–10,000 g/mole could also be employed). Titration experiments demonstrated that the polyimide had approximately one free amine group for every 6 to 12 polymer chains. The polyimide was refered to as "PEI" for polyetherimide. PEKK/PEI blends were produced by physically mixing the PEKK and polyimide pellets with subsequent extrusion in a single screw extruder at 355° with the final die temperature set at 275°. Five different compositions of PEKK/PEI were extruded (by weight): 100/0, 60/40, 50/50, 40/60, and 0/100.

There was only a nominal difference (4–8%) in density between the pure polymers and blends after combining with immediate extrusion at 10 revolutions per minute (RPM). This indicates that very little reaction occured, and that reaction time and/or bubble nucleation and growth processes require a longer time period for the blended samples.

Figure 3:
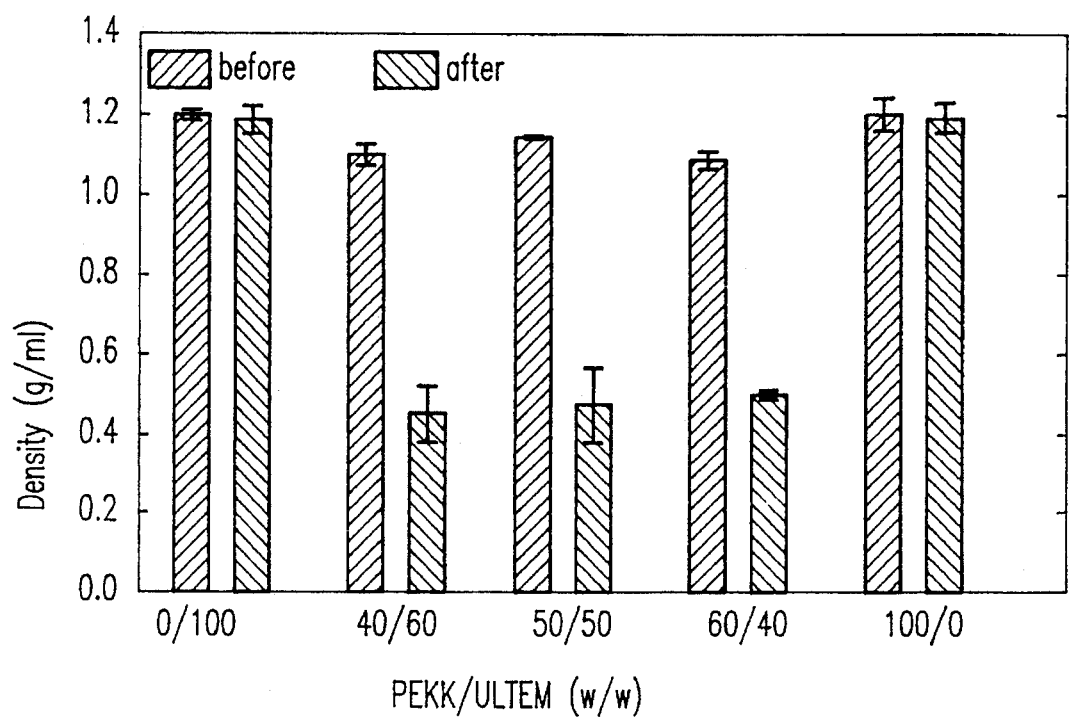
FIG. 3 is a bar graph showing the density of poly(ether ketone ketone) (PEKK) and polyether imide (PEI) blends.

However, FIG. 3 shows that when the extrusion process was halted for five minutes with some of the material remaining in the die and being allowed to react, the densities of the resulting material for the PEKK/PEI blends that was held in the die was dramatically lower than the PEKK/PEI counterparts which were extruded without extra residence time. In particular, there was over a 60% drop in density in all cases with the PEKK/PEI blends. For comparison purposes, the density measurements for the pure polymers (100/0 and 0/100) before and after five minutes residence time demonstrate no drop in density. Scanning Electron Microscopy (SEM) revealed the presence of a closed-cell cellular structure in the blended, die-resident, samples, and the lack of a foam structure in the non-resident counterpart. The lack of a foam structure for the pure polymers was confirmed by SEM. Thus, the ketimine reaction which produces the graft co-polymer is clearly able to produce a foamed material.

It should also be understood, that the ketimine reaction demonstrated by the above experiment can also occur within a single polymer chain having both carbonyl and amine moieties.

In a variation on the first embodiment, a carbonyl could be reacted with an amine on the same polymer chain to produce a foamed polymer. An example of the polymers which could be used in this matter are polyimides which have free amine ends and are based on monomer units which posess ketone linkages, such as benzophenonetetracarboxylic acid dianhydride (BTDA). Molecular weights of polymers such as these would range between 5,000 and 40,000 g/mole.

In a second embodiment of the invention, two small molecular weight compounds, one of which has an amine moiety and the other of which has a carbonyl moiety, are combined with a polymer or polymer blend that is to be foamed. Exemplary compounds include aceanthrenequinone, 9-acetylanthracene, 9(10H)-acridone, 1-aminoanthracene, 1-aminoantraquinone, and 1-aminoindan. Ideally, both small molecular weight compounds would have a molecular weight less than 250 g/mole. The composition is then mixed and heated to cause a ketimine or aldimine reaction between the two small molecular weight compounds. The resulting gaseous water byproduct then blows the polymer or polymer blend into a foamed material. The polymer or polymers used in the polymer blend will typically have a molecular weight ranging from 10,000 to 40,000 g/mol.

As discussed above, the concentration of amine and carbonyl moieties, mixing, temperature and pressure control, and reaction time can all be used to control the degree of porosity or density in the resulting product. It is expected that a wt % concentration of 0.1–10% of the two small molecular weight compounds and 99.9–90% of the polymer or polymeric composition will be suitable for most applications. The ketimine or aldimine compound created during forming may itself be vaporized during heating to aid in foam formation, or may be leached or otherwise extracted from the foam after the foam is produced. The invention should have particular utility in producing PAEK foams and high performance polyimide foams.

In a variation on the second embodiment, it may be advantageous to have combine a single small molecular weight compound (ideally, less than 500 g/mole) that has both a carbonyl moiety and an amine moiety with a polymer to be foamed, whereby the small molecular weight compound will have the carbonyl and amine react in an intramolecular manner to produce a gaseous water byproduct that foams the polymer.

In a third embodiment of the invention, a small molecular weight compound having either an amine or carbonyl moiety is combined with a polymer having the opposite moiety (e.g., a carbonyl if the small molecular weight compound has an amine, and an amine if the small molecular weight compound has a carbonyl). As discussed above, the small molecular weight compound ideally less than 250 g/mole and can be aceanthrenequinone, 9-acetylanthacene, 9(10H)-acridone, 1-aminoanthracene, 1-aminoantraquinone, and 1-aminoindan, or other suitable compounds, and the polymer can be a PAEK material, a polyimide material, an amine terminated polyester, an amine terminated polyamide, or other suitable material. For most applications, the composition should include 0.1%–10% by weight of the small molecular weight compound and 99.9%–90% by weight of the polymer. As discussed above, the concentration of amine and carbonyl moieties, mixing, temperature and pressure control, and reaction time can all be used to control the degree of porosity or density in the resulting product.

A particular advantage of the third embodiment is that it also provides a technique for modifying the polymer backbone or endgroup with a constituent of interest. Specifically, a polymer may be modified to include constuents that enhance metal adhesion, or constituents that selectively bind to biological or chemical materials of interest, or constituents that have pharmaceutical applications. This is accomplished by selecting a constituent of interest to be the small molecular weight compound so that after reacting to produce the foam, the constituent is bonded to the foamed polymer through a ketimine or aldimine linkage.

It is envisioned that the foaming properties described above can have particular application in the production of new and useful liquid crystal polymer (LCP) materials. In operation, an LCP could be added to any of the foamable polymer systems described above (e.g., first-third embodiments, and their variations). Preferably, the LCP would be included at a concentration of 10% to 90% by weight in the polymer system. Suitable LCPs would include Vectra® available from Hoechst Celanese, Xydar® available from Amoco, and Zenite® available from DuPont. The polymer system would then be foamed as described above, with the LCP in place. The foamed product which results would have isotropic mechanical properties. This is due to the LCP following the cell pattern in the foam. By contrast, most currently available thermotropic LCP materials have only directionaly dependent dimensional stability. In addition to isotropic mechanical properties, the resulting foam will have enhanced toughness and impact resistance. The beneficial properties of including the LCP materials in the foamable polymer system could be realized with very little foaming (e.g., polymer foam density reduction of 20%). As an alternative means for producing an LCP containing foam, the LCP itself could be foamed according to the procedures described above. For example, an amine containing polymer (e.g., ULTEM) could be reacted with a ketone group on an LCP. Examples of LCPs which could be used in this manner are main-chain polyester LCPs based on the dihydroxybenzophenone (DHBP) monomer (see, German Patent 2,932,178, and U.S. Pat. Nos. 4,335,232, 4,487,916, 4,499,259, and 4,398,015, all of which are herein incorporated by reference).

While the invention has been described in terms of its preferred embodiments, those skilled in the art will recognize that the invention can be practiced with modification within the spirit and scope of the appended claims.

We claim:

1. A method for producing foamed polymeric materials, comprising the steps of:
   combining a first polymer having carbonyl functionality and a second polymer having amine functionality to produce a reactive composition;
   heating said reactive composition under conditions sufficient to cause a ketimine or aldimine reaction between carbonyl moieties of said first polymer with amine moieties of said second polymer, said ketimine or aldimine reaction causing the release of water from said reactive composition and resulting in in-situ foaming of said reactive composition, said ketimine or aldimine reaction producing a foamed reaction product; and
   recovering said foamed reaction product.

2. The method recited in claim 1 wherein said carbonyl moieties in said first polymer are aldehydes.

3. The method recited in claim 1 wherein said carbonyl moieties in said first polymer are ketones.

4. The method recited in claim 1 wherein said first polymer is selected from the group consisting of poly(arylene ether ketones) and ketone containing liquid crystal polymers.

5. The method recited in claim 1 wherein said second polymer is selected from the group consisting of polyimides, polyetherimides, polyamides, and amine terminated polyesters.

6. The method recited in claim 1 further comprising the steps of:
   determining a density for said foamed reaction product; and
   selecting said first polymer to have a first number of carbonyl moieties, a first molecular weight, and a first concentration in said reactive composition, and said second polymer to have a second number of amine moieties, a second molecular weight, and a second concentration in said reactive composition, whereby said density achieved in said foamed reaction product produced during said heating step is controlled by said selecting step.

7. The method recited in claim 6 wherein said density determined during said determining step ranges between 0.04 g/ml to 1.2 g/ml,
   wherein said first polymer used in said selecting step has said first number of carbonyl moieties ranging between one and five per monomer repeat unit, said first molecular weight ranging between 10,000 and 40,000 grams per mole, and said first concentration in said reactive composition ranging between 1 and 99 percent by weight, and
   wherein said second polymer used in said selecting step has said second number of amine moieties which is at least one, said second molecular weight ranging between 1,000 and 40,000 g/mole, and said second concentration in said reactive composition ranging between 1 and 99 percent by weight.

8. The method recited in claim 1 further comprising the step of adding a liquid crystal polymer to said reactive composition prior to said heating step.

9. A method for producing foamed polymeric materials, comprising the steps of:
   providing a reactive composition comprising a polymer having a carbonyl functionality and an amine functionality;
   heating said reactive composition under conditions sufficient to cause a ketimine or aldimine reaction between carbonyl moieties and amine moieties of said polymer, said ketimine or aldimine reaction causing the release of water from said reactive composition and resulting in in-situ foaming of said reactive composition, said ketimine or aldimine reaction producing a foamed reaction product; and recovering said foamed reaction product.

10. The method recited in claim 9 wherein said carbonyl moieties are selected from the group consisting of aldehydes and ketones.

* * * * *